No. 713,128. Patented Nov. 11, 1902.
W. A. MILNE.
PEAT DRIER.
(Application filed July 5, 1901.)
(No Model.)

Witnesses.
Inventor.
W. A. Milne

UNITED STATES PATENT OFFICE.

WILLIAM ATKINSON MILNE, OF BROWN'S CORNERS, CANADA.

PEAT-DRIER.

SPECIFICATION forming part of Letters Patent No. 713,128, dated November 11, 1902.

Application filed July 5, 1901. Serial No. 67,172. (No model.)

*To all whom it may concern:*

Be it known that I, WILLIAM ATKINSON MILNE, lumberman, of the village of Brown's Corners, in the county of York, in the Province of Ontario, Canada, have invented certain new and useful Improvements in Peat-Driers, of which the following is a specification.

My invention relates to improvements in peat-driers for drying peat; and the object of the invention is to provide a simple and efficient machine of this class which will dry the peat rapidly without affecting its calorific properties; and it consists, essentially, of a sheet cylinder-casing supported on suitable arms which are connected to sleeves at each end, such sleeves being free on the longitudinal shaft which extends through the casing, longitudinal beaters being provided on the ends of arms attached to the shaft and driving means being provided on the cylinder at one end and on the shaft, so that the cylinder and beaters are driven at different rates of speed, the machine being constructed and arranged in detail, as hereinafter more particularly explained.

Figure 1:
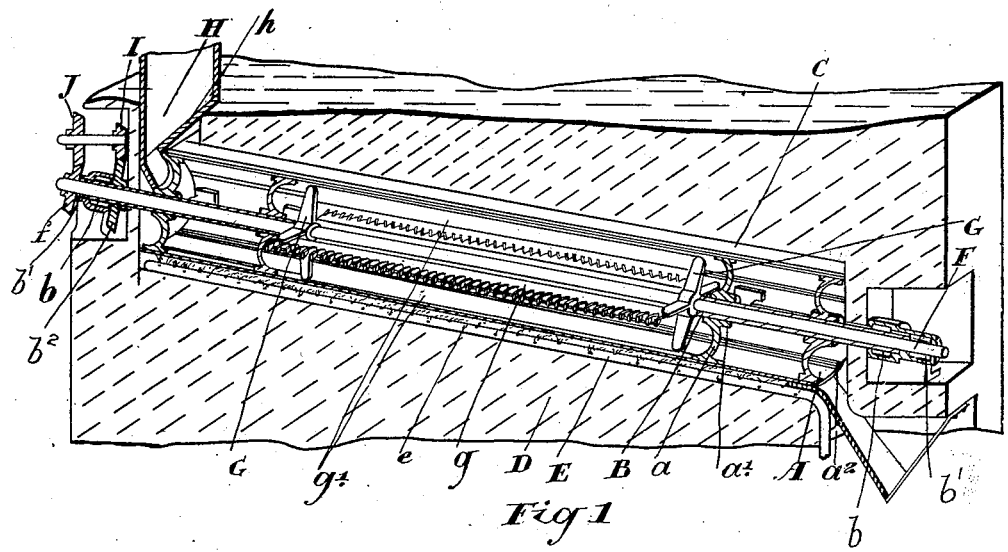
Figure 2:
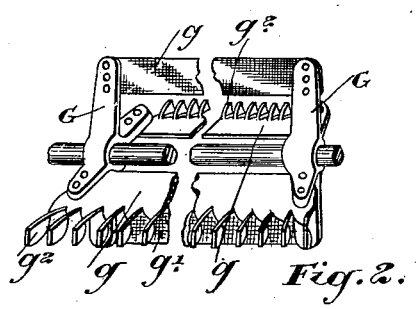
Figure 3:
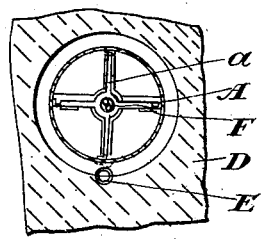

Figure 1 is a sectional perspective view showing my improved peat-drier. Fig. 2 is a detail of the beaters, such beaters and shafts on which they are situated being intermediately broken away. Fig. 3 is a cross-section.

In the drawings like letters of reference indicate corresponding parts in each figure.

A is a cylindrical casing made, preferably, of sheet-iron and supported upon the sleeves B at each end by means of the arms $a$, suitably secured to the casing and attached to or forming part of the hub $a'$. The casing A is provided with a series of internal longitudinal ribs $a^2$ at equal distances apart. The casing A is located in a furnace-chamber C of corresponding form and of greater diameter than the casing A, such chamber being formed within a suitable fire-brick covering or support D, and E is a gas-pipe having perforations $e$, to which the gas extends and is lighted, so as to apply heat to the casing A at any desired temperature. It is of course not necessary to have a gas-pipe and gas for heating the casing A; but I show this as one means of producing the desired effect—that is, heating the casing A and the interior thereof.

F is the longitudinal shaft which extends through the sleeves B and projects at each end beyond the ends of the casing A. The outer ends of the sleeves B are journaled in suitable bearings $b$, and the outer end of the shaft F is journaled in suitable bearings $b'$. It is of course not necessary to describe these roller-bearings, as they are commonly known.

G represents two sets of arms or spiders, located one toward each end of the casing A and secured on the shaft F. There are preferably four arms in each set, and to the ends of the diametrically opposite arms are secured the plates $g$ and the wire-mesh strips $g'$, which form beaters. The plates $g$ have the outer edge cut or serrated and given a quarter-twist, so as to form a series of fingers $g^2$, the faces of which are parallel with the plane of the ends of the cylindrical casing. It will be noticed that the cylinder is inclined and is preferably so.

H is a chute located at the upper end of the cylinder and designed to feed the peat into the cylinder at one end.

$h$ is a deflecting-plate secured to the end of the chamber and designed to direct the peat into the cylinder. The upper end of the uppermost sleeve B is provided with a beveled gear $b^2$, and the upper end of the shaft F is provided with a beveled gear $f$, which mesh, respectively, with the beveled wheels I and J of the driving-shaft J.

It will now be seen by the size and arrangement of the gearing, as shown and above described, that the cylinder A and shaft F will be driven in the same direction, but that the shaft, and consequently the beaters, will be driven at a greater rate of speed than the cylinder. It will thus be understood that when the peat is fed into the hopper H it will pass downwardly through the casing A and will be acted upon by the beaters as they rotate, thereby disintegrating it and stirring it up as it rises on the longitudinal ribs, which are of course outside of the path of the beaters. The interior thereof is kept at a proper degree of temperature. It will thus be seen that not only the beaters themselves but the fanning action thereof will serve to disintegrate the peat and at the same time keep the same stirred up within the casing, so that it will act with the greatest efficiency upon the particles to remove the moisture and will prevent the peat from being deleteriously affected by the action of the heat. The peat will gradually work its way through the cylindrical casing A and pass out into the discharge-chute at the lower end.

What I claim as my invention is—

In a device of the class described, the combination with a cylindrical casing suitably rotated and journaled, of the beaters comprising arms secured to the shaft and longitudinal plates secured to the ends of the arms and having outwardly-projecting fingers or blades carried by the same and set so as to be parallel at their outer ends to the ends of the cylinder as specified.

WILLIAM ATKINSON MILNE.

Witnesses:
B. BOYD,
R. SHIELDS.